(12) United States Patent
Chen et al.

(10) Patent No.: US 6,549,882 B1
(45) Date of Patent: Apr. 15, 2003

(54) MECHANISMS FOR PROVIDING AND USING A SCRIPTING LANGUAGE FOR FLEXIBLY SIMULATIONG A PLURALITY OF DIFFERENT NETWORK PROTOCOLS

(75) Inventors: Huei-Ping Chen, San Jose, CA (US); Ting Chuan Tan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/217,012

(22) Filed: Dec. 21, 1998

(51) Int. Cl.[7] .................... G06F 13/10; G06F 13/12; G06F 9/44; G06F 15/173
(52) U.S. Cl. ................... 703/21; 703/20; 703/13; 703/17; 703/23; 709/223; 709/224
(58) Field of Search ................... 703/23, 24, 20, 703/21, 13, 22, 25, 17; 709/223, 224

(56) References Cited

U.S. PATENT DOCUMENTS

| | | | | |
|---|---|---|---|---|
| 5,394,540 A | * | 2/1995 | Barrington et al. | 395/500 |
| 5,680,585 A | * | 10/1997 | Bruell | 395/500 |
| 5,732,213 A | * | 3/1998 | Gessel et al. | 709/224 |
| 5,748,617 A | * | 5/1998 | McLain, Jr. | 370/244 |
| 5,862,362 A | * | 1/1999 | Somasegar et al. | 395/500 |
| 5,889,954 A | * | 3/1999 | Gessel et al. | 709/223 |
| 5,892,947 A | * | 4/1999 | DeLong et al. | 395/701 |
| 5,931,961 A | * | 8/1999 | Ranganathan et al. | 714/712 |
| 5,937,165 A | * | 8/1999 | Schwaller et al. | 709/224 |
| 5,954,829 A | * | 9/1999 | McLain, Jr. et al. | 714/712 |
| 6,041,041 A | * | 3/2000 | Ramanathan et al. | 370/241 |
| 6,134,690 A | * | 10/2000 | Ivaturi et al. | 714/736 |
| 6,269,330 B1 | * | 7/2001 | Cidon et al. | 704/43 |

* cited by examiner

Primary Examiner—Hugh Jones
Assistant Examiner—W D Thomson
(74) Attorney, Agent, or Firm—Beyer, Weaver & Thomas, LLP.

(57) ABSTRACT

Provided are test systems, methods, and media which allow a user to script any type of test or model scenario based on a particular type of network traffic (e.g., protocol interaction). In preferred embodiments, the script provides for the generation of packets (stimuli) which are used to provoke responses in order to model or test proper operation of one or more network protocols. The invention includes a scripting language, also referred to as a stimulus/response engine, which includes commands specifying a state change of a network device, and provides for the establishment of packet filters based on expected network traffic, receiving and matching arriving packets with packet filters, and, where there is a match, conducting actions specified by the user in the script.

A stimulus/response engine (SRE) in accordance with the present invention is dynamic it that it accommodates patterns (packet filters) which are modified during test runs. The SRE is fully programmable by the user and thus can be used to design models and test scenarios for a variety of network protocols, including new protocols developed by the user for which no testing packages exist.

28 Claims, 7 Drawing Sheets

MECHANISMS FOR PROVIDING AND USING A SCRIPTING LANGUAGE FOR FLEXIBLY SIMULATIONG A PLURALITY OF DIFFERENT NETWORK PROTOCOLS

BACKGROUND OF THE INVENTION

The present invention relates to computer networks. More particularly, the invention relates the testing and simulation of computer networks, and to a scripting language, also referred to as a stimulus/response engine, for modeling state machines used in the testing of computer network protocols.

Traffic on computer networks is composed of multiple protocol interactions which work in concert to provide connectivity, bandwidth utilization, content provisioning, security, and reliability. Often multiple protocols are required in the course of a transaction to achieve a network application objective. Emulating this behavior in the test lab without installing and configuring all of the devices and protocols involved in such a transaction is a significant challenge facing network equipment vendors and consumers.

A tool that is useful in network protocol testing is a network traffic analyzer (NTA). An example of a NTA is the Pagent™ product developed by Cisco Systems, Inc. ("Cisco"). Pagent is a version of the Cisco Internet Operating System (IOS®) which has been modified to generate and receive network traffic for network simulation and testing purposes. However, NTAs like Pagent have limited utility as test systems since they are not able to respond to the content of test packets ("stimuli"), and cannot be programmed to provide test scenarios for a variety of protocols. Instead, an NTA is only able to generate, send, receive and count packets.

Network testing tools have been developed which address sub-components of these protocols (individual protocol conformance test suites). For example, Midnight Networks, Inc. has a tool, ANVL, which provides an application performance interface (API) set that can be used to create individual protocol conformance test suites. However, this tool is implemented in the computer language C, and requires a C development environment in order to be used.

Alternative systems, such as a protocol analyzer available from Hewlett-Packard, provide hard-coded NTAs which are able to provide responses to packet content, but only in a very narrow, predefined manner. Such systems cannot be programmed to test a variety of protocols, and are not capable of implementing dynamic test scenarios, that is, scenarios in which packets are modified during the course of the test.

Thus, current network test systems are limited to individual protocols, unable to respond to packets other than to count them (that is, they cannot respond to packet content), or are hard-coded so that packets transmitted by a network traffic analyzer have known content in a narrowly-defined range with predefined responses. Moreover, conventional network test systems are not dynamically configurable to different protocols by the user, and are not dynamic. This is particularly a problem for newly-developed protocols since dedicated test systems are expensive to construct and are typically developed at a much later time.

Accordingly, what is needed is a test system which can replicate the rich, dynamic protocol interactions and dialogues necessary to test and model behavior in network protocol stacks.

SUMMARY OF THE INVENTION

The present invention meets this need by providing test systems, methods, and media which allow a user to script any type of test or model scenario based on a particular type of network traffic (e.g., protocol interaction). In preferred embodiments, the script provides for the generation of packets (stimuli) which are used to provoke responses in order to model or test proper operation of one or more network protocols. The invention includes a scripting language, also referred to as a stimulus/response engine, which includes commands specifying a state change of a network device, and provides for the establishment of packet filters based on expected network traffic, receiving and matching arriving packets with packet filters, and, where there is a match, conducting actions specified by the user in the script.

A stimulus/response engine (SRE) in accordance with the present invention is dynamic in that it accommodates patterns (packet filters) which are modified during test runs. The SRE is fully programmable by the user and thus can be used to design models and test scenarios for a variety of network protocols, including new protocols developed by the user for which no testing packages exist.

A SRE in accordance with the present invention is built on a state machine model. Since many internet protocols are also defined in terms of state machine models, these protocols may be easily translated into a SRE script for testing and simulation purposes. As noted, a SRE in accordance with the present invention is scriptable, so that it may be modified and extended to test a variety of network protocols. A SRE in accordance with the present invention also uses a send/expect model in its scripting format.

In one aspect, the present invention provides a method, implemented on a computing device, for simulating one or more network activities. The method involves providing program code for generating a model of one or more network devices. The program is written in a language that includes commands specifying a state change of a network device. The program code is then converted, preferably using an interpreter, to machine executable instructions for executing the model.

In another aspect, the invention provides a computer program product including a computer-usable medium having computer-readable program code embodied thereon for effecting such a method.

In yet another aspect, the invention provides a system for controlling the generation of a model of one or more network devices, with the aid of a network device. The system includes a converter that recognizes program code commands specifying a state change of a network device and converts such program code to produce a model of one or more network devices, and a network device operating system on which the program code runs.

These and other features and advantages of the present invention will be presented in more detail in the following specification of the invention and the accompanying figures which illustrate by way of example the principles of the invention.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

The present invention provides test systems, methods, and media which allow a user to write a script emulating any type of network traffic (e.g., protocol interaction) and to respond based on the stimuli provided (packets sent) by that script. Various aspects of the present invention incorporate an network device operating system (NDOS)-based scripting language, sometimes referred to as a stimulus/response engine. A stimulus/response engine (SRE) in accordance with a preferred embodiment of the present is programmable and can respond based on the content a variety of stimuli provided in a test scenario. A preferred SRE in accordance with the invention is also dynamic, in that it accommodates packets modified during test runs. Further, since a SRE in accordance with the present invention is scriptable, it may be modified and extended to test a variety of network protocols.

Figure 1:
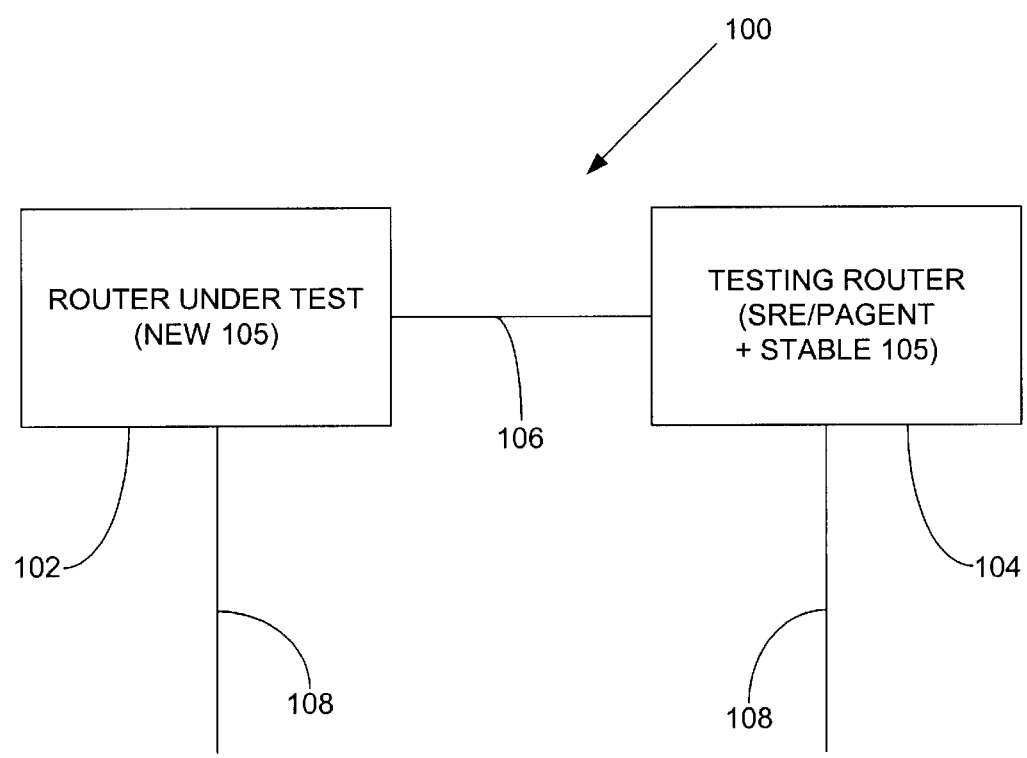
FIG. 1 depicts a block diagram illustrating an example of network test system implementation in accordance with a preferred embodiment of the present invention.

FIG. 1 illustrates a block diagram of a simple network test system in accordance with a preferred embodiment of the present invention. The system 100 includes two routers. It should be understood that a stimulus/response engine in accordance with the present invention may be implemented with a single router or with more than two routers, as explained in more detail below. A two router system is a particularly preferred test configuration since it offers the opportunity to test inter-device network protocols while minimizing the network structure required for testing.

The test system features a router 102 which is configured to run a new version of an operating system for a network device. This router 102 may be referred to as the "router-under-test." The router-under 102 test is connected to a second router 104 which is configured to run a stimulus/response engine in accordance with the present invention, together with a network traffic analyzer (NTA), such as Cisco's Pagent™, and a stable version of a NDOS, such as Cisco's IOS®, running on the router-under-test 102. The two routers 102 and 104 are connected by any networking medium 106. A particularly preferred network medium is Ethernet (or Fast Ethernet or Gigabyte Ethernet). However, the medium may also be a serial link, for example. Each router 102 and 104 also normally has connected to it a console line 108 used for controlling the router. Further details relating to preferred implementations of the present invention and discussed below with reference to FIG. 5.

In the preferred embodiment of the present invention depicted in FIG. 1, SRE scripts are written and run on the testing router 104 resulting in packets being sent from the testing router 104 to the router-under-test 102. The SRE establishes packet filters designed to match the response to the stimulus (packet(s)) sent expected from the router-under-test 102. When a packet comes back in to the testing router 104 from the router-under-test 102, the SRE matches against the established filters. If there is a match, the action(s) associated with the matching packet filter are taken.

A SRE in accordance with a preferred embodiment of the present invention is primarily based on two concepts: the state machine and the send/expect model. Since many internet protocols are also defined in terms of state machine models, these protocols may be easily translated into the SRE for testing and simulation purposes. A SRE model (e.g., a SRE script) defines states useful for testing protocol interactions, for example in a new NDOS version, and control is transferred between these states. The send/expect model is an idea adapted from Unix tcl/expect script, wherein a character string is sent, and another character string with a specific pattern is expected to come back in response. With an SRE, a packet filter is created and registered based on a packet to be sent out. The packet is then sent, and a packet (having a pattern) matching the filter is expected to come back. This send/expect model is adapted in the SRE in this way so that a quick response to a packet that has been sent by the router on which the SRE is running will not be missed while the packet filter is being established, as is discussed further below.

A SRE in accordance with the present invention is not only able to verify proper operation against specifications to demonstrate conformance, but also to create a generic state machine-based, network-aware toolkit that can be used anytime there is a need to determine correct or incorrect operation of a set of network protocol interactions. The present invention provides a state machine engine and primatives for a variety of networking protocols. As such it does not constrain the user to create conformance validators. A SRE in accordance with the present invention allows any protocol or multi-protocol dialog to be replicated.

SRE Basics

Figure 2:
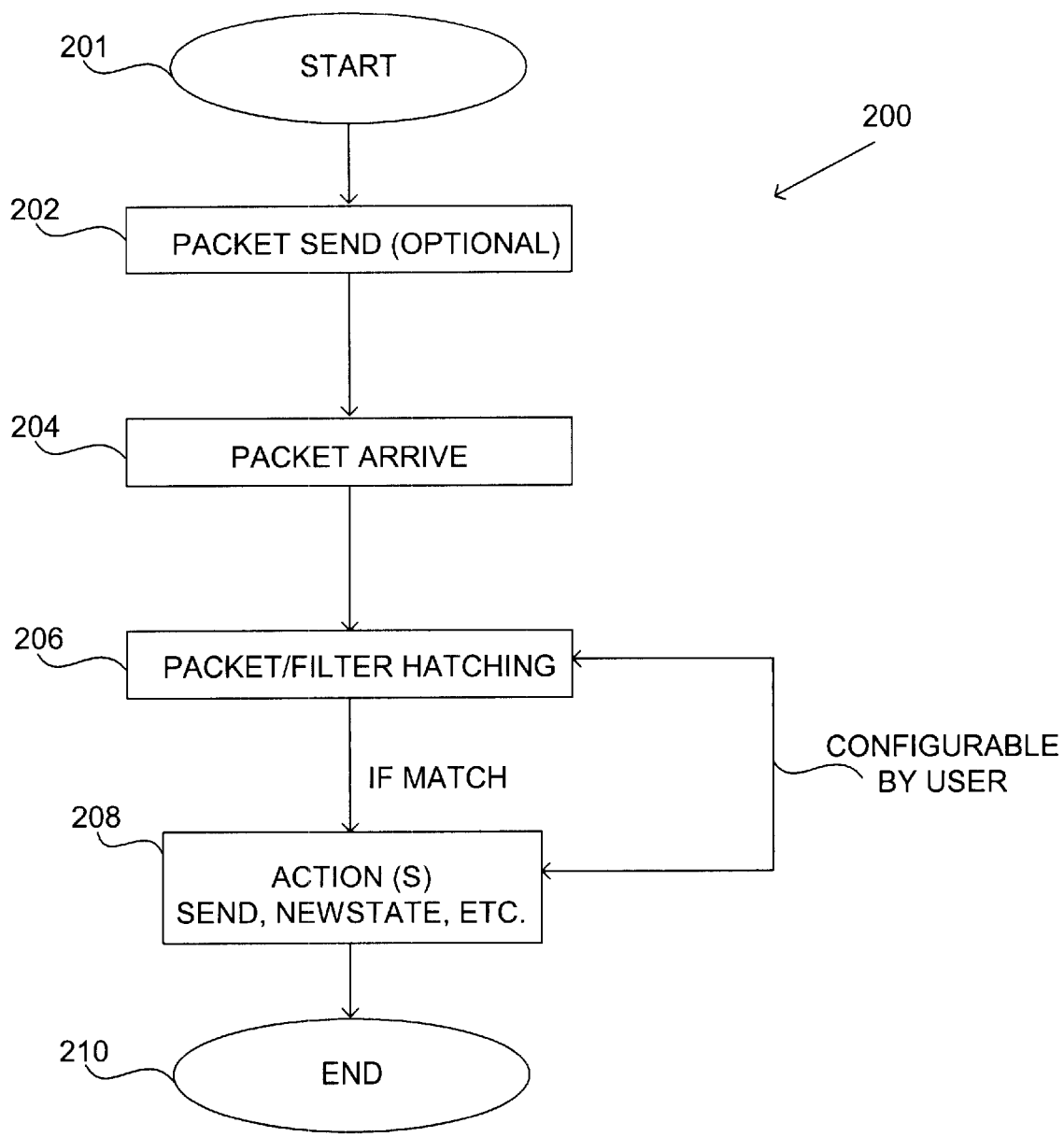
FIG. 2 illustrates a flow chart for a generic process of testing a suite of network protocols on a send/expect model, in accordance with a preferred embodiment of the present invention.

A stimulus/response engine is a scripting language that allows a user to script a logical representation of virtually any network protocol. FIG. 2 depicts a flow chart for a generic process of testing a suite of network protocols on a send/expect model, in accordance with a preferred embodiment of the present invention. The process 200 begins at 201, and at an optional step 202 a packet (stimulus) is sent from an SRE state machine. This step 202 is optional because frequently a networking environment includes one or more entities which act as "servers" and others that act as "clients." Servers wait for requests to come in from clients. If a server is being tested, then the SRE script used to conduct the test will typically begin with a the sending of a request (stimulus) to the server. However, if a server is being emulated (e.g., to test a client) will begin with waiting for a request; in this circumstance, the sending of a stimulus is unnecessary.

At a step 204, a packet arrives in the SRE state machine, and at a step 206 the packet is matched against packet filters for expected packets. If an incoming packet matches a packet filter, one or more actions are taken at a step 208, for example to indicate that the expected response to a stimulus was received. Actions may include, for example, printing a message, sending another packet, establishing a new packet filter, and/or transferring control of the state machine to another state. If no match is made, that also may be indicated by printing a message or invoking a timeout. The process ends at 210.

A SRE uses a network traffic analyzer (NTA) to assist in the construction and manipulation of packets and packet filters (packets used as filters). In the description of a preferred embodiment of a SRE herein, reference is made to Cisco's Pagent™ NTA for packet construction and manipulation. In this regard, packets are referred to as originating or existing in Pagent "workspace," and certain Pagent commands and invoked to construct or modify packets or load SRE scripts. It should be understood, however, that Pagent is not an integral part of the SRE. A SRE merely interfaces with a NTA for its packet construction and manipulation requirements. Any NTA has packet construction and manipulation as primary functions. A description of the Pagent NTA functionalities relevant to SRE is provided herein. However, it should be understood that a SRE in accordance with the present invention may be used in conjunction with any compatible NTA.

As noted above, a SRE script is based on a state machine model. Therefore, a SRE script defines one or more states and transfers control between them. This is also referred to as a SRE process. SRE state definition makes use of SRE simple statements, SRE compound statements. In addition, SRE router command line interface (CLI) commands are used to assist in running a SRE script. These SRE commands and their use are described below.

SRE State Definition

The following is a generic SRE state definition:
sre define <StateName>
    <any number of SRE simple statements>
    <optional expect compound statement>
        <any number of packet compound statement>
            <any number of SRE simple statements>
        <optional timeout compound statement>
            <any number of SRE simple statements>
end A SRE state definition is composed of an optional number of SRE simple statements (zero or more), and optionally followed by a SRE expect compound statement. The expect compound statement is composed of an optional number of packet compound statements, and optionally followed by a timeout compound statement. The packet compound statement is composed of a packet filter, and an optional interface parameter which specifies the interface on which to expect the response packet to be received. If no interface parameter is specified, SRE may use an interface defined in the packet filter, and if not defined, may use the default interface. The body of a packet compound statement, is composed of any number of SRE simple statements, described below, including preferably a newstate statement (specifying a transition to a different state). The timeout compound statement specifies a timeout value to wait for a packet to be received. If no packet is received within the specified timeout value, the statements in the timeout compound statement are executed.

When a packet comes in, it is matched against the packet filter from the first packet compound statement to the last. If it matches a filter, the statements in the packet compound statement are executed, and the control will fall off the expect statement. If there is no newstate statement in the packet compound statement, the state machine will stop. If there is a newstate statement in the packet compound statement, the control follows the newstate.

An example of such a state definition is provided by the following code segment:

```
sre define CLIENT_1
    send request
    expect
        packet response
            print "response received"
            newstate CLIENT_2
        end
        timeout
            print "timeout error"
            exit
        end
    end
end
```

The sample state definition includes one simple send statement up front in the CLIENT_1 state definition. As noted in the generic script, it is possible to optionally have zero or more simple statements. The send statement is followed by an expect compound statement, which is also optional. Inside the expect compound statement, there is one packet compound statement, which again is optional, and in this case includes print and newstate (transferring control to state CLIENT_2) simple statements. It is also possible to have a timeout compound statement inside a expect statement, as here containing a print simple statement.

SRE CLI Commands

The following is a list of SRE CLI commands, in accordance with a preferred embodiment of the present invention, together with examples illustrating their use:

Define

This command is used to define a SRE state. The scope of a state name is global. Thus, if the same state name has previously been defined, the SRE clears the old definition in favor of the new state definition. "StateName" may be any character string. The syntax for the command is as follows:
sre define <StateName>

Undefine

This command is used to delete a SRE state. "StateName" may be any character string. The syntax for the command is as follows:
sre undefine <StateName>

Start

This command is used to start a SRE state machine, and indicate that the initial state should be "StateName." A SRE state machine runs by default in the background, unless "foreground" is specified. The syntax for the command is as follows:
sre start [foreground] <StateName>

Stop

This command is used to stop a SRE state machine. A particular StateName, Process ID, or "*", which means stop all SRE processes, may be specified. The syntax for the command is as follows:
sre stop {<ProcessID>|<StateName>|*}

Display Process

This command is used to display the SRE processes currently running. A particular StateName, Process ID, or "*", which means display all SRE processes, may be specified. The syntax for the command is as follows:
sre display process {<ProcessID>|<StateName>|*}

Display Runtime

This command is used to display runtime information for SRE processes currently running. A particular StateName, Process ID, or "*", which means display all SRE process runtime information, may be specified. The syntax for the command is as follows:
sre display runtime {<ProcessID>|<StateName>|*}

Display Workspace

This command is used to display SRE workspace information. A particular StateName, Process ID, or "*", which means display all SRE process workspace information, may be specified. The syntax for the command is as follows:
sre display workspace {<WorkspaceName>|*}

Trace

This command is used to turn SRE internal trace on or off. The trace utility provides a status log of an SRE state machine. In a preferred embodiment, SRE trace uses an IOS® logging utility. In this embodiment, by default the trace does not appear on the control console, but an IOS® "show log" command may be used to display internal logging information. The syntax for the command is as follows:
sre trace {on|off}

Source-Verbose

This command is used to turn on or off source-verbose mode. "Source" is a IOS® command used to load a script into a router. In a preferred embodiment of the present invention, the SRE scripts that are being loaded are not displayed. Turning on the source-verbose mode causes the SRE scripts that are being loaded to be displayed. The syntax for the command is as follows:
sre source-verbose {on|off}

SRE Statements

The following is a list of SRE simple and compound statements in accordance with a preferred embodiment of the present invention, together with examples illustrating their use:

Send

The "send" command is used to send a packet over an interface or internally to another SRE state machine. An interface over which the packet is to be sent may optionally be specified. In a preferred embodiment, the command has the syntax:
send <packetname> [interface<interface>]

The "send" command directs packets created and stored by a NTA, for example in a Pagent workspace. If no interface is specified either from the NTA or the send command, the stimulus may retrieve the interface from the transaction record or the command line.

The following is an example of the use of a "send" command to send a packet out of an e0/0 interface, where the packet "ping_request" is defined by an NTA in accordance with an SRE script, for example with the Pagent "add" command:
send_ping request interface e0/0

Expect

SRE "expect" is a compound statement. The command may be composed of multiple pattern/action pairs. The actions associated with a pattern (packet/filter) will be carried out when a stimulus and response matches the pattern specified. In a preferred embodiment, the stimulus and response pattern may contain one of the following formats:

packet: A packet filter/pattern that can be used to match the incoming packets. Multiple packet filters may be specified by users.

timeout: The action associated with the timeout is invoked when a timer expires before all other conditions are met. Only one "timeout" clause is allowed.

When an "expect" command is issued, it starts the timer and waits for the incoming packets to match the patterns specified. If the pattern is matched, the timer will be turned off and the actions specified in the pattern will be executed. If no incoming packets match the patterns before the timer expire, the actions in the timeout clause will be invoked.

An "expect" command" has the following syntax, with the bracketed ([ ])items being optional:
expect
   <any number of packet compound statement>
      <any number of SRE simple statements>
   <optional timeout compound statement>
      <any number of SRE simple statements>
end where, the keyword "expect" by itself indicates the start of an expect compound statement. The statements inside an expect compound statement can be an optional number of packet compound statements, and an optional number of timeout compound statements.

The following example counts the number of IP packets and displays the result after 10 seconds has expired:
expect
   packet any_ip
      set a=a+1
      continue
   end
   timeout 10000
      print "a=$a"
   end
end Packet A packet pattern/filter allows a SRE to pick up the incoming packets that match the pattern. For example, users can define a pattern to match any IP packets or match any packet destined for certain IP address. "Packet" is a sub-command to the "expect" command used to register the pattern/filter. "Packet" is a compound statement and, in a preferred embodiment, has the following syntax, with the bracketed ([ ])items being optional:
packet <filtername> [saveto <packetname>] [interface <interfacename>] [from internal]

where "filtername" is a packet in Pagent (NTA) workspace. "Packetname" is a dummy packet defined in Pagent workspace. The purpose of the dummy packet is to reserve name space under Pagent workspace so the received packet can be saved into Pagent workspace for future access. The "interface" parameter specifies the interface to monitor for the specified filter pattern. The "from internal" parameter specifies that you are looking for packet internally from another sre state machine.

The following is an example of the form of a packet command. The first two lines of code are for the NTA to construct the desired packets.
add $$ name filter select on byte 0 1234
add $$ name request
sre define state
   expect
      packet filter saveto request
         print "received request"
      end
      timeout 1000
         print "timeout"
      end
   end
end Timeout The "timeout" command allows users to specify actions in the event that no pattern is matched. The syntax of the timeout subcommand is:
timeout <time in milliseconds>

Newstate

This command is used to transfer the control flow to another state. Certain applications require multiple states to perform a transaction. "newstate" provides the ability to change the state by invoking another transaction record. Once the transaction record is ended, the control will return back and proceed to execute the body.

The following example shows two states, SEND and RECEIVE, where command "newstate" is used to transfer control between two states:

```
sre define RECEIVE
   expect
      packet requset
         print "request received"
         newstate SEND
      end
      timeout
         print "timeout error"
         exit
      end
   end
end
sre define SEND
   send response
   newstate RECEIVE
end
```

Print

This command is used to send print out information on the console. The syntax for the command is as follows:

print "<character strings>"

The "character strings" may contain a variable (e.g., "${variablename}"), which will be replaced with the content of the variable.

The following is an example of print a message with "count" information in it.

print "current count=$ {count}."

Patch

A patch statement takes the value of a variable and patches it to a packet, starting from a specified offset with a specified length. The syntax for the command in a preferred embodiment of the present invention is as follows:

patch from <variablename> to <packetname> [start-at [network|datalink]] [offset #] [length #]

The following example takes the value of a variable "d" and patches it to the packet "ping_pak" starting from offset 6 of the packet and modifing 6 bytes. Essentially, this operation overwrites the source MAC address of the packet.

patch from d to ping_pak offset 6 length 6

Extract

The "extract" statement extracts a value from a packet and puts the extracted value into a variable, starting from a specified offset with a specified length. The syntax for the command in a preferred embodiment of the present invention is as follows:

extract from <packetname> to <variablename> [start-at [network|datalink]] [offset #] [length #]

The following example extracts the source MAC address of a packet and out into a variable s starting from offset 6 of the packet and modifing 6 bytes.

extract from ping_pak to s offset 6 length 6

Delay

The "delay" statement delays the control flow for the specified milliseconds. The syntax for the command in a preferred embodiment of the present invention is as follows:

Delay <#milliseconds>

The following is an example of a command to delay 100 milliseconds before sending out a packet.

delay 100
   send ping_request

Continue

The "continue" command is used inside a packet compound statement. It is used to establish a loop, so that when an event occurs (e.g., a packet comes in or timeout expires), a process is returned to the expect statement to repeat the process again. "Continue" in SRE has the same function as the "continue" in Unix Tcl/Expect.

The following example illustrates the use of a continue command in a portion of SRE code, in accordance with a preferred embodiment of the present invention, which counts the number of incoming packets:

```
sre define COUNT
   set a=0
   expect
      packet packet_filer
         set a=a+1
         continue
      end
   end
end
```

Set

The "set" command supports simple arithmetic operations, including addition, subtraction, multiplication, division, module, and and/or operations. The syntax for the command in a preferred embodiment of the present invention is as follows:

set <variablename>=<variablename> [operator <variablename>]

where operator is one of +, −, *, /, %, &, and |.

The following examples show some simple arithmetic operations using the set command:

set count=0
set sequence=sequence+1
set a=a−1
set b=c * d
set d=d/5

If

The "if" command provides a mechanism for a conditional branch. It contains a condition and an action statement which is executed if the condition is true. The condition supported is a simple arithmetic comparison, and the action is a "newstate" command. The syntax for the command in a preferred embodiment of the present invention is as follows:

if [<variablename>|<constant>] <operator> [<variablename>|<constant>] newstate <statename> where the operator is one of <, <=, < >, =, >, and >=.

The following example illustrates the use of an "if" command in a portion of SRE code:

```
sre define state1
   set count=count+1
   if count==5000 newstate donestate
   . . .
end
sre define donestate
   print "done"
end
```

Exit

This command is used to end the control flow of a state machine. The following code segment shows the "exit" command used to exit out of a state machine if timeout error occurs.

```
sre define state1
   expect
      packet requset
         print "request received"
         newstate state2
      end
      timeout
         print "timeout error"
         exit
``` end
  end
end
Send/Expect Model

The send/expect model is used to establish a packet filter before its corresponding packet is sent. When an SRE sees a "send" statement while an SRE script is running, it assumes that a packet is expected to come back in response, so it looks forward to search for an "expect" statement. If it finds one, it takes all of the "packet" statement, and builds an appropriate filter for each packet sent. This filter is then applied to incoming packets. In this way, it is guaranteed that no matter how fast the response to a particular packet may come back the SRE will be ready for it.

This benefits of this approach impose a constraint on the programming style of SRE scripts, in that it is unadvisable to patch a packet filter after a packet is sent. Therefore, in preferred embodiments of the present invention, if a packet filter is patched after a packet is sent, the SRE will issue a warning to the user.

The following example illustrates this concept:

```
sre define TEST1
    set a=a+1
    patch from a to request offset 20 length 1
    send request
    print "send request sequence number $a"
    patch from a to response offset 20 length 1
    expect
        packet response
            print "response receive"
            newstate TEST1
        end
        timeout 1000
            print "timeout"
            exit
        end
    end
end
```

In the example, the state TEST1 sends out a packet with sequence number of a, and expect to receive a response of sequence number a. However, it sends out the request and patches the response to sequence number a before setting up the packet filter. This opens up a window during which, if the response comes back too fast, the response may be lost. Therefore, the preferred programming style is as follows:

```
sre define TEST1
    set a=a+1
    patch from a to request offset 20 length 1
    patch from a to response offset 20 length 1
    send request
    print "send request sequence number $a"
    expect
        packet response
            print "response receive"
            newstate TEST1
        end
        timeout 1000
            print "timeout"
            exit
        end
    end
end
```

EXAMPLES

SRE scripts representing virtually any network protocol may be written using the commands and generic forms described above in accordance with the present invention. Two examples which illustrate the use of the commands and forms to script network protocols for testing or simulation purposes in accordance with preferred embodiments of the present invention are described below. It should be understood that the following is representative only, and that the invention is not limited by the details set forth in these examples.

Pingpong Example

This example uses a script which passes a packet back and forth between two routers in order to illustrate basic features of a preferred SRE. The sample script is called "PING-PONG.SRE". The PINGPONG.SRE SRE script involves two routers, tools2 and tools3, both of which are running a SRE. In an actual two-router test scenario, only one router (testing router) typically runs a SRE to test the response of the other (router-under-test (or unit-under-test, UUT)), as described with reference to FIG. 1. This example has SREs running on both routers in order to illustrate the command structure of a SRE in a simplified manner.

Tools2 operates in two states, TOOLS2 and TOOLS2_RECEIVE. State TOOLS sends a packet, and state TOOLS2_RECEIVE waits for a packet to come back. Tools3 operates in three states, TOOLS3, TOOLS3_RECEIVE and TOOLS3_SEND. State TOOLS3 initializes the packet filter, TOOLS3_RECEIVE waits for a packet, and TOOLS3_SEND sends out a packet. The extra TOOLS3 state is included in state machine tools3 since it is the first to receive a packet, and there is no prior send statement form which to establish a packet filter for the initial incoming packet.

The packets required for the example SRE script are constructed by a network traffic analyzer prior to starting the script. In this case, two packets, tools2_to_tools3 and tools3_to_tools2, are created in accordance with the following NTA commands which clear any packets having those names and establish the parameters of the packets.

```
clear tools2_to_tools3
add $$ name tools2_to_tools3 select on length 80 length 80
    byte 0
00000C0E58C1 00000C09F3CE 12340000
quit
clear tools3_to_tools2
add $$ name tools3_to_tools2 select on length 80 length 80
    byte 0
00000C09F3CE 00000C0E58C1 12340000
quit
```

Figure 3A:
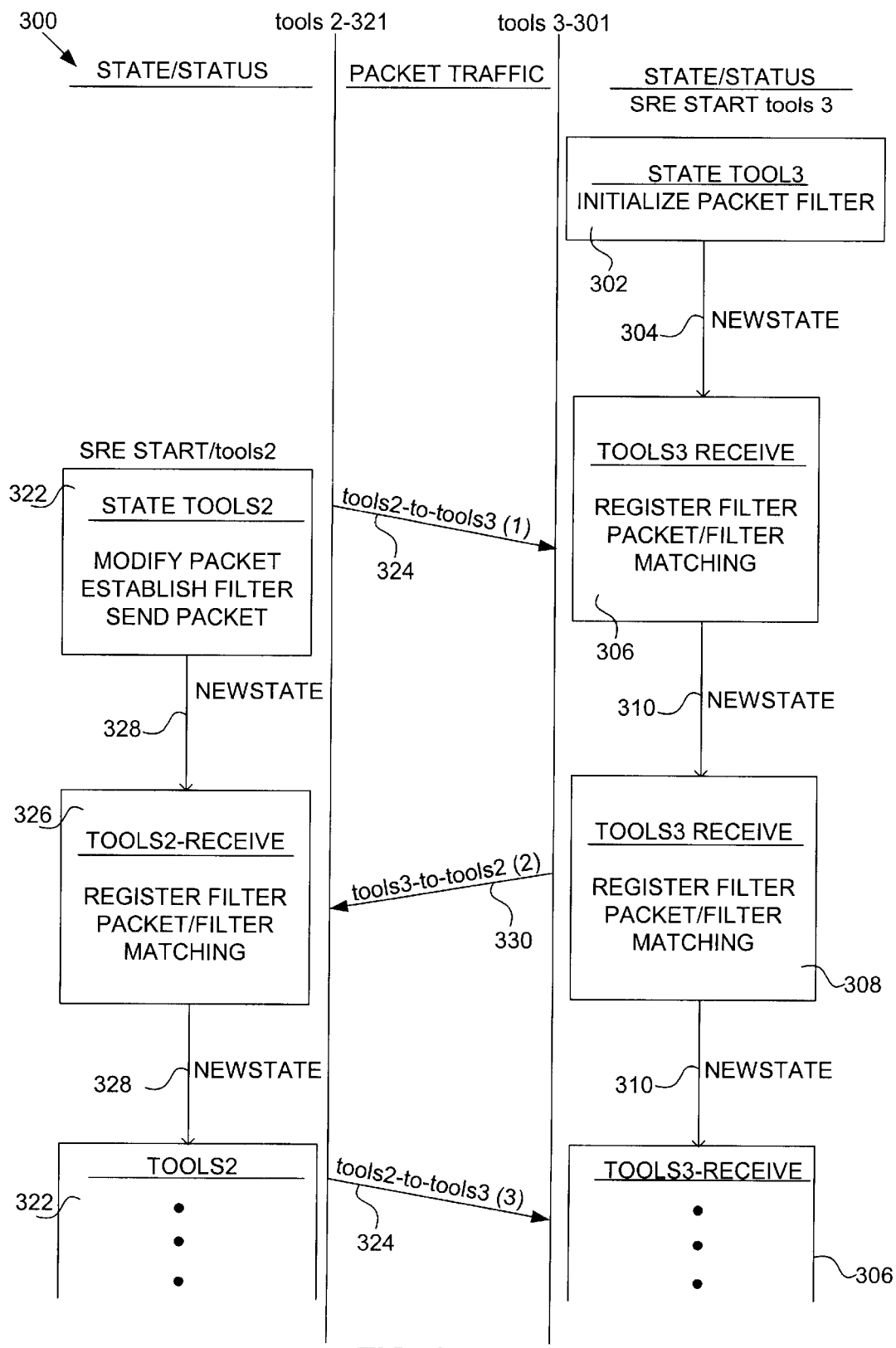
FIG. 3A illustrates a flow diagram for a sample protocol to illustrate the organization of a SRE script and its dynamic scripting capacity, in accordance with a preferred embodiment of the present invention.

The example, is illustrated in a flow diagram 300 in FIG. 3A. The state machine of router tools3 301 is started first in initial SRE state TOOLS3 302. In state TOOLS3, a packet filter (tools2_to_tools3) is initialized. The script portion defining state TOOLS3 is as follows:

```
sre define TOOLS3
    set a=a+1
    patch from a to tools2_to_tools3 offset 16 length 2
    newstate TOOLS3_RECEIVE
end
```

From the foregoing explanation of SRE commands, in may be understood from this code that state TOOLS3 302 is defined to increment a variable a, in this case a packet sequence number, and then modify a packet tools2_to_tools3 with a patch to reflect the incremented sequence number (initially to equal 1 for the first packet to be received). Control is then transferred, as illustrated by arrow 304, to a state TOOLS3_RECEIVE 306 with a newstate command.

State TOOLS3_RECEIVE is defined as follows:
sre define TOOLS3_RECEIVE
  expect
    packet tools2_to_tools3
      extract to b offset 16 length 2
      print "received $b"
      delay 1000
      newstate TOOLS3_SEND
    end
  end
end In this state 306, the state machine (tools3) is expecting (expect statement) an incoming packet matching the packet filter tools2_to_tools3 initialized in state TOOLS3 302, and registered by the packet statement in this state 306. If a packet tools2_to_tools3 (b) (initially tools2_to_tools3 (1)) is received (that is, there is a packet/filter match), its sequence number "b" is extracted (extract statement) and "received [b]" is printed (print statement). After a delay of 1000 milliseconds, control is transferred by a newstate command to a new state, TOOLS3_SEND 308, as illustrated by arrow 310.

In the meantime, the state machine on router tools2 321 is started with SRE state TOOLS2 322. State TOOLS2 is defined as follows:
sre define TOOLS2
  set a=a+1
  patch from a to tools2_to_tools3 offset 16 length 2
  print "send $a"
  set a=a+1
  patch from a to tools3_to_tools2 offset 16 length 2
  send tools2_to_tools3
  newstate TOOLS2_RECEIVE
end TOOLS2 increments a variable "a," the packet sequence number, and then modifies a packet tools2_to_tools3 with a patch to reflect the incremented sequence number, and prints "send [a]" to the console to indicate that a packet with sequence number "a" (initially 1; tools2_to_tools3 (1)) is being sent. Next, a filter is established for the packet expected in response to the packet being sent. The expected packet will be a tools3_to_tools2 packet having the next sequence number. Therefore, the sequence number variable "a" is incremented using a set command, and a tools3_to_tools2 packet is modified using a patch command to contain the next sequence number (e.g., 2). The packet (initially tools2_to_tools3 (1)) is then sent to router/state machine tools3 301, as illustrated by arrow 324 using a send command. Control is then transferred, as illustrated by arrow 306, to a state TOOLS2_RECEIVE 328 with a newstate command.

As noted previously, state machine tools3 301 was started before state machine tools2 321, and when a packet tools2_to_tools3 (initially tools2_to_tools3 (1)) is sent, it is in state TOOLS3_RECEIVE 306. When the packet is received, it is matched with the registered filter tools2_to_tools3 (b) (initially tools2_to_tools3 (1)). If there is a match, as in this case, the actions prescribed by state TOOLS3_RECEIVE 306 (described above) are carried-out.

As noted above, once a tools2_to_tools3 packet has been sent, control for state machine tools2 321 is transferred to a state TOOLS2_RECEIVE 328. State TOOLS2_RECEIVE is defined as follows:
sre define TOOLS2_RECEIVE
  expect
    packet tools3_to_tools2
      extract to b offset 16 length 2
      print "received $b"
      delay 1000
      newstate TOOLS2
    end
  timeout 3000
    print "^G** timeout **^G"
    exit
  end
end In this state 326, the state machine (tools2) is expecting (expect statement) an incoming packet matching the packet filter tools3_to_tools2 established in state TOOLS2 322, and registered by the packet statement in this state 326. If a packet tools3_to_tools2 (b) (initially tools2_to_tools3 (2 (derived from incremented sequence number a from state TOOLS2))) is received (that is, there is a packet/filter match), its sequence number "b" is extracted (extract statement) and "received [b]" is printed (print statement). After a delay of 1000 milliseconds, control is transferred by a newstate command back to state, TOOLS3_SEND 308, as illustrated by arrow 310. In this example, if no matching packet is received over a period of 3000 milliseconds, "**timeout**" is printed, as directed by timeout and print commands.

Meanwhile, in state machine tools3 301, control is transferred from TOOLS3_RECEIVE to TOOLS3-SEND 308, as noted above. State TOOLS3_SEND is defined as follows:
sre define TOOLS3_SEND
  set a=a+1
  patch from a to tools3_to_tools2 offset 16 length 2
  print "send $a"
  set a=a+1
  patch from a to tools2_to_tools3 offset 16 length 2
  send tools3_to_tools2
  newstate TOOLS3_RECEIVE
end TOOLS3_SEND increments the packet sequence number variable "a," then modifies packet tools3_to_tools2 with a patch to reflect the incremented sequence number, and prints "send [a]" to the console to indicate that a packet with sequence number "a" (now tools2_to_tools3 (3) at this point in the example) is being sent. Next, as in TOOLS2_SEND, a filter is established for the packet expected in response to the packet being sent. The expected packet will be a tools2_to_tools3 packet having the next sequence number. Therefore, the sequence number variable "a" is incremented using a set command, and a tools2_to_tools3 packet is modified using a patch command to contain the next sequence number (e.g., 4). The packet (tools2_to_tools3 (3) at this point) is then sent to router/state machine tools2 321, as illustrated by arrow 330 using a send command. Control is then transferred, as illustrated by arrow 332, back to state TOOLS3_RECEIVE 306 with a newstate command.

As noted previously, prior to sending packet tools3_to_tools2 (3), control of state machine tools2 321 was transferred to state TOOLS2_RECEIVE, and is expecting a tools3_to_tools2 (3) packet. When the packet is received, it is matched with the registered filter tools3_to_tools2 (b). If there is a match, as in this case, the actions prescribed by state TOOLS2_RECEIVE 326 (described above) are carried-out.

Once the script is written it may be loaded into each of the routers by a NDOS command, such as the IOS® command "source", for example, as follows:

tools3#source pingpong.sre
Loading huchen/pingpong.sre from 192.1.1.2 (via Ethernet3/0):!
[OK—1511/65535 bytes]
sre define TOOLS2
sre define TOOLS2_RECEIVE
sre define TOOLS3
sre define TOOLS3_RECEIVE
sre define TOOLS3_SEND
tools3#
tools2#source pingpong.sre
Loading huchen/pingpong.sre from 192.1.1.2 (via Ethernet0/0):!
[OK—1511/65535 bytes]
sre define TOOLS2
sre define TOOLS2_RECEIVE
sre define TOOLS3
sre define TOOLS3_RECEIVE
sre define TOOLS3_SEND
tools2#

Then TOOLS3 is started on router tools3, for example as follows:
tools3#sre start TOOLS3
state TOOLS3 started
process ID: 17
before TOOLS2 is started on router tools2, for example as follows:
tools2#sre start TOOLS2
state TOOLS2 started
process ID: 17

As soon as TOOLS2 is started, the two state machines start passing the packet back and forth between each other. This example will continue along these lines, with the two state machines alternating between send and receive, so that a packet being "pingponged" back and forth between the two routers according to the SRE script. The print out generated by the script for each router over nine iterations is as follows:
tools2#
send 1
received 2
send 3
received 4
send 5
received 6
send 7
received 8
send 9
tools3#
received 1
send 2
received 3
send 4
received 5
send 6
received 7
send 8
received 9

Figure 3B:
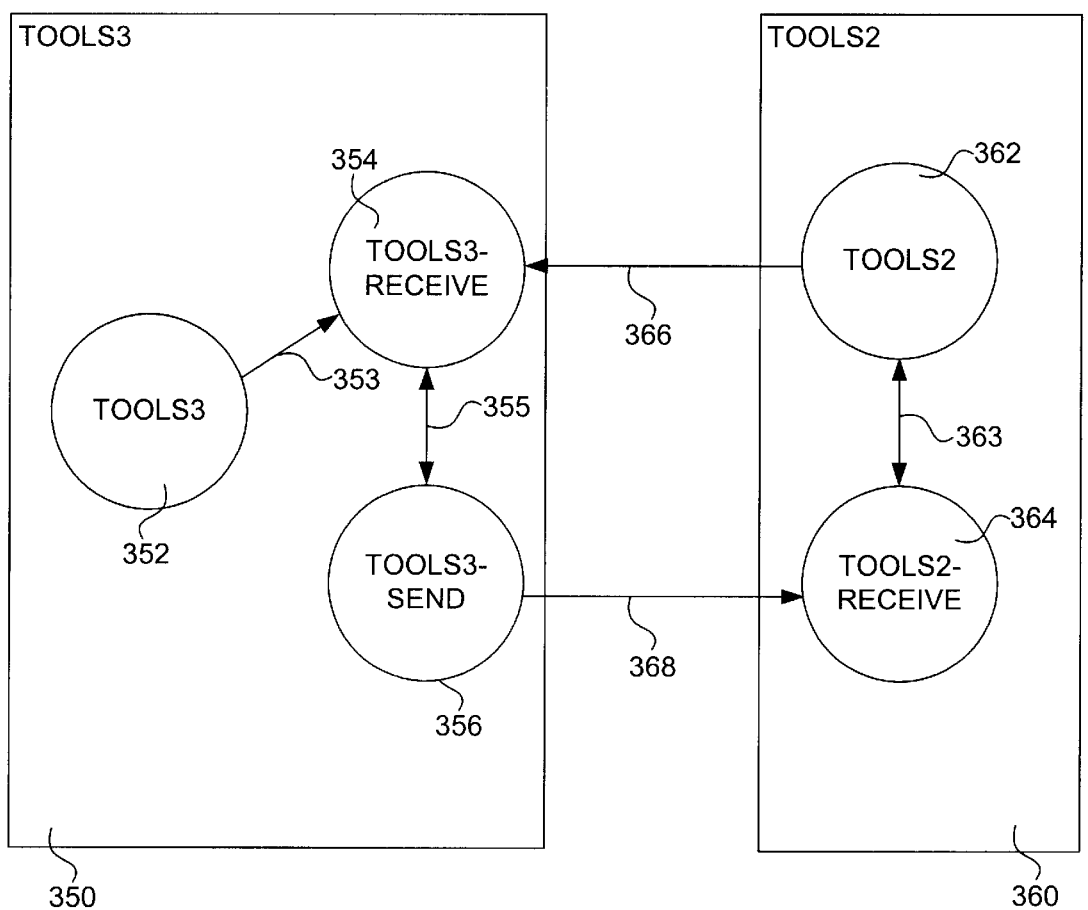
FIG. 3B illustrates a state diagram for the sample protocol of FIG. 3A, illustrating the organization of a SRE script and its dynamic scripting capacity, in accordance with a preferred embodiment of the present invention.

FIG. 3B depicts a state diagram illustrating the relationships of the states of the two state machines, and the interrelationships of the two state machines. State machine tools3 350 has three states: TOOLS3 352, TOOLS3_RECEIVE 354, and TOOLS3_SEND 356. State machine tools2 360 has two states: TOOLS2 362 and TOOLS2_RECEIVE 364. The arrows within the state machines indicate the changes of state that take place during the running of the state machines.

The arrows 353 and 355 between TOOLS3 352 and TOOLS3_RECEIVE 354, and TOOLS3_RECEIVE 354 and TOOLS3_SEND 356, respectively indicate that control is transferred from TOOLS3 352 to TOOLS3_RECEIVE 354 when the state machine 350 is started, and thereafter moves back and forth between TOOLS3_RECEIVE 354 and TOOLS3_SEND 356. Similarly, the arrow 363 between TOOLS2 362 and TOOLS2_RECEIVE 364 indicates that control is transferred back and forth between TOOLS2 362 and TOOLS2_RECEIVE 364 in state machine 360.

Arrows 366 and 368 illustrate the interrelation of the two state machines 350 and 360. Arrow 366 shows that packets are sent from state machine tools2 360 to state machine tools3 350 when tools2 is in state TOOLS2 362 and tools3 is in state TOOLS3_RECEIVE 354. Similarly, arrow 368 shows that packets are sent from state machine tools3 350 to state machine tools2 360 when tools3 is in state TOOLS3_SEND 356 and tools2 is in state TOOLS2_RECEIVE 364.

Layered Protocol Stack Example

This is a more realistic example of an application of a SRE. It provides for the sending of packets between state machines, and includes passing packets between protocol stacks and layers in protocol stacks. This example illustrates how an SRE may be used to represent and test complex network protocol interactions.

Figure 4A:
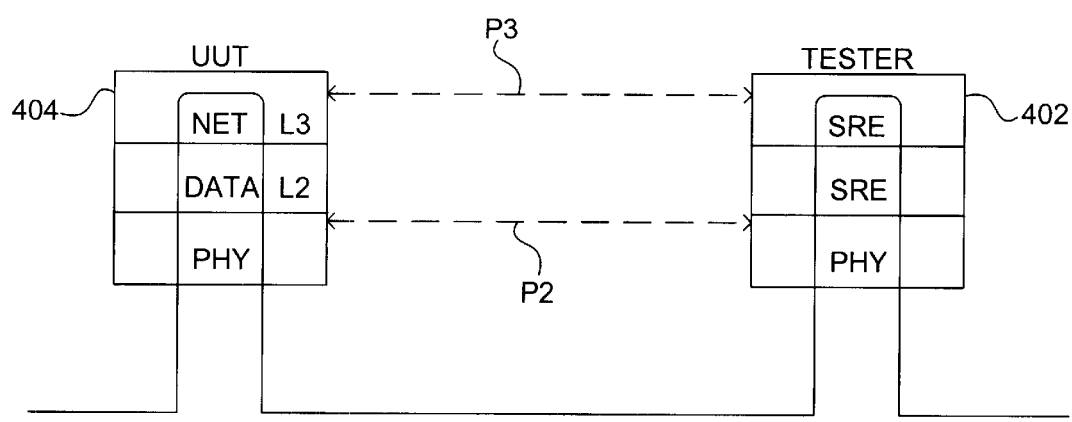
FIG. 4A depicts a block diagram illustrating a sample test system implementation for testing with layered protocol stacks, in accordance with a preferred embodiment of the present invention.

The example involves testing packet transmission between addresses on two protocol layers, Layer 2 and Layer 3. As illustrated in FIG. 4A, such transmission may occur, for example, for network communication between layers L3 of a Tester router 402 and unit-under-test (UUT) 404 in simulated network 400. In order for packets to be passed between Layers L3 according to protocol P3, Layers L2 must be effectively communicating according to protocol L2. In addition, internal layers L2 and L3 for each router must be able to communicate effectively.

This example focuses on the internal protocol interaction between Layer 3 and Layer 2 in the tester router 402, both of which are running SRE state machines. Layer 2 protocol is a much simplified version of the LLC2 protocol, and has three states. Layer 3 protocol state machine is composed of two states.

The state machine of layer L2 on the tester router 402 is started first in initial SRE state L2_INIT 422. In state L2_INIT packet filters are registered (expect and packet commands) for the internal packet CONNECT and the packet SABME_f. The action associated with the internal filter CONNECT (to be taken if a matching packet is received) is to send a packet SABME_o and then transfer control to a new state (newstate command) L2_CONNECTING. The action associated with the filter SABME_f is to send a packet UA_o and then transfer control to a new state (newstate command) L2_ACTIVE. The script portion defining state L2_INIT is as follows:
sre define L2_INIT
  expect
    packet CONNECT from internal
      # start make a connection
      send SABME_o
      newstate L2_CONNECTING
    end
    packet SABME_f
      # received a SABME, accept the connection
      send UA_o
      newstate L2_ACTIVE
    end
  end
end Once state machine L2 has been started in stateL2_INIT, state machine L3 is started in state L3_INIT. L3_INIT is defined as follows:

```
sre define L3_INIT
    send CONNECT to internal
    newstate L3_CONNECTING
end
```
A packet CONNECT is sent internally (i.e., within the protocol stack of the L3 state machine) and then control of the L3 state machine is transferred to state L3_CONNECTING.

State L3_CONNECTING is defined as follows:
```
sre define L3_CONNECTING
    expect
        packet CONNECTED from internal
            print "CONNECTED"
        end
end
```
An internal packet filter CONNECTED is registered. If a packet matching the CONNECTED filter is received, the action taken in state L3_CONNECTING is to print "CONNECTED" to the console, indicating that a connection between Layers L3 and L2 has been made.

When the CONNECT internal packet has been sent in state L3_INIT, it is received in L2, which is in state L2_INIT. As described above, when L2 receives a CONNECT internal packet, it matches with the CONNECT internal packet filter, resulting in the sending of a SABME_o packet (to L2 of the UUT). Control of the L2 state machine 421 is then transferred to state L2_CONNECTING.

State L2_CONNECTING is defined as follows:
```
sre define L2_CONNECTING
    expect
        packet UA_f
            print "Link Up"
            set vr=0
            set vs=0
            set nr=0
            set ns=0
            set count=0
            patch from ns to RR_f offset 13 length 1
            delay 1000
            send RR_o
            send CONNECTED to internal
            newstate L2_ACTIVE
        end
        timeout 3000
            print "Link Establishment Failed"
            newstate L2_INIT
        end
    end
end
```
A packet filter UA_f is registered and the actions to be taken if a matching packet comes in include printing "Link Up," setting a variety of variables, modifying a packet (RR_f) to update its sequence number (ns) and establish a filter, sending a packet RR_o, and sending an internal packet CONNECTED. Following these actions, control of the L2 state machine is transferred to a new state (newstate command) L2_ACTIVE. If no matching packet is received within 3000 milliseconds "Link Establishment Failed" is printed and control is transferred back to state L2_INIT.

The third state of state machine L2 is L2_ACTIVE. L2_ACTIVE is defined as follows:
```
sre define L2_ACTIVE
    expect
        packet RR_f saveto RR_i
            print "$ {count}"
            set count=count+1
            extract from RR_i to vr offset 1 length 1
            delay 1000
            patch from ns to RR_f offset 13 length 1
            patch from ns to RR_o offset 13 length 1
            send RR_o
            newstate L2_ACTIVE
        end
        timeout 3000
            print "Link Down"
            newstate L2_INIT
        end
    end
end
```
Packet filter RR_f is registered, and anything matching it is saved as packet RR_i. The count is printed and the count variable incremented. Variable vr is extracted from packet RR_I and a delay of 1000 milliseconds is invoked. Packets RR-f and RR_o are modified to update there sequence numbers (ns), packet RR_o is sent, and control is retained in state L2_ACTIVE for the expect statement to be followed through again. If no matching packet is received within 3000 milliseconds "Link Down" is printed and control is transferred back to state L2_INIT.

Figure 4B:
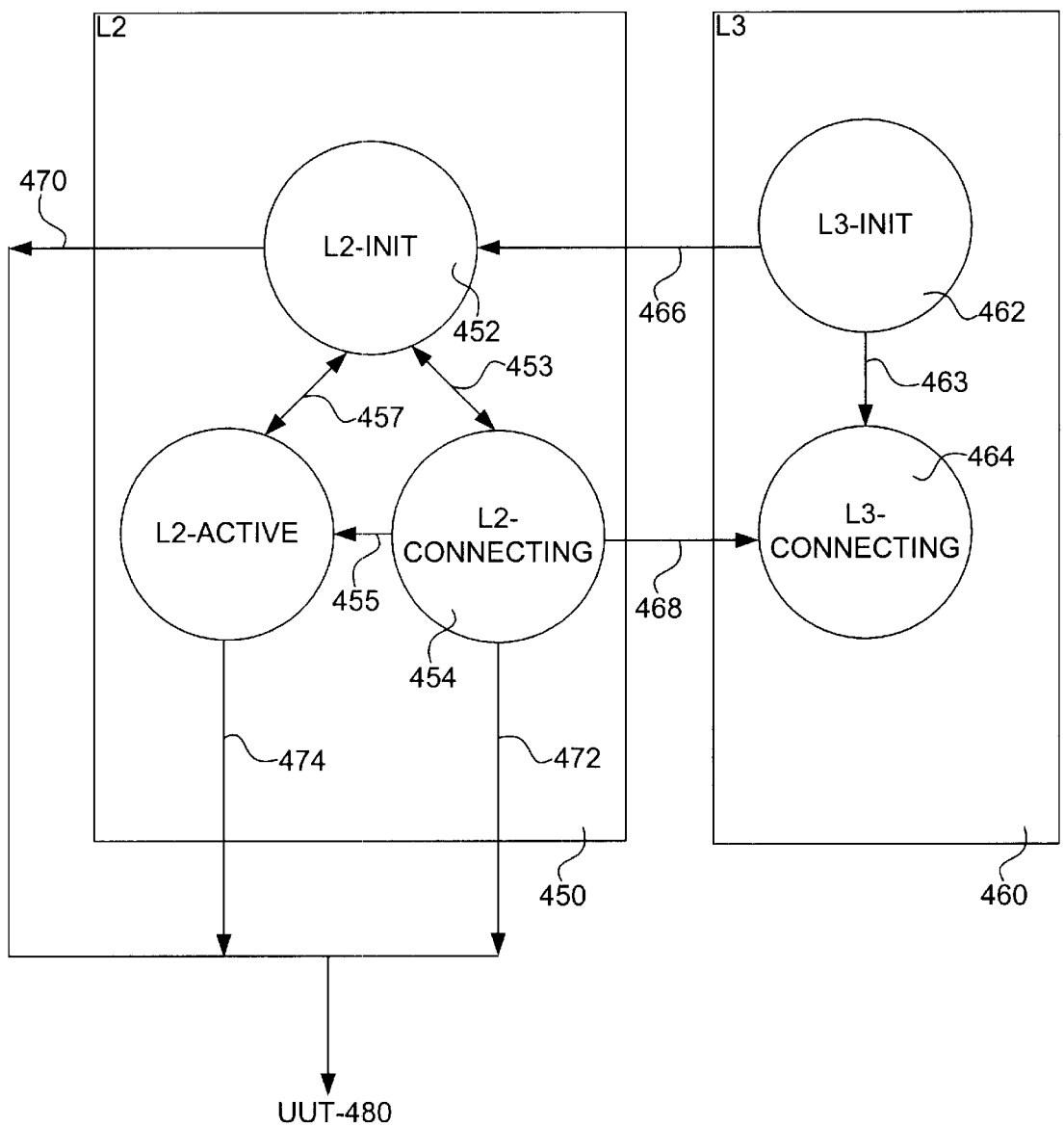
FIG. 4B depicts a state diagram illustrating the organization a SRE script for testing the layered protocol stacks depicted in FIG. 4A, in accordance with a preferred embodiment of the present invention.

FIG. 4B depicts a state diagram illustrating the relationships of the states of the two state machines on the tester router, the interrelationships of the two state machines, and the interrelationships between the tester router and the UUT in this example. State machine L2 450 has three states: L2_INIT 452, L2_CONNECTING 454, and L2_ACTIVE 456. State machine L3 460 has two states: L3_INIT 462 and L3_CONNECTING 464. The arrows within the state machines indicate the changes of state that take place during the running of the state machines.

The arrows 453, 455 and 457 between L2_INIT 452 and L2_CONNECTING 454, and L2_INIT 452 and L2_ACTIVE 456, and L2_CONNECTING 454 and L2_ACTIVE 456, respectively, indicate that control may be transferred back and forth between L2_INIT 452 and L2_CONNECTING 454, and L2_INIT 452 and L2_ACTIVE 456, and that control may be transferred from L2_CONNECTING 454 to L2_ACTIVE 456 in state machine L2 450. Similarly, the arrow 463 between L3_INIT 462 and L3_CONNECTING 464 indicates that control is transferred from L3_INIT 462 to L3_CONNECTING 464 in state machine 460.

Arrows 366 and 368 illustrate the interrelation of the two state machines 450 and 460. Arrow 466 shows that (internal) packets are sent from state machine L3 460 to state machine L2 when L3 is in state L3_INIT 462 and L2 is in state L2_INIT 452. Similarly, arrow 468 shows that (internal) packets are sent from state machine L2 450 to state machine L3 460 when L2 is in state L2_CONNECTING 454 and L3 is in state L3_CONNECTING 464.

In addition, arrows 470, 472, and 474 illustrate the interrelation of the tester router on which the two state machines 450 and 460 run with the UUT 480. Arrows 470, 472, and 474 illustrate that, in each of its three states, state machine 450 may send packets to the UUT.

Implementation

Generally, a system in accordance with this invention may be specially constructed for the required purposes, or it may be a general-purpose programmable machine selectively activated or reconfigured by a computer program stored in memory. The processes presented herein are not inherently related to any particular router or other network apparatus. Preferably, the invention is implemented on a network device designed to handle network traffic. Such network devices typically have multiple network interfaces including relay and ISDN interfaces, for example. Specific examples of such network devices include routers and switches. For example, the address translation systems of this invention may be specially configured routers such as specially configured router models 1600, 2500, 2600, 3600, 4500, 4700, 7200, and 7500 available from Cisco Systems, Inc. of San Jose, Calif. A general architecture for some of these machines will appear from the description given below. In an alternative embodiment, the system may be implemented on a generalpurpose network host machine such as a personal computer or workstation. Further, the invention may be at least partially implemented on a card (e.g., an interface card) for a network device or a general-purpose computing device.

Figure 5:
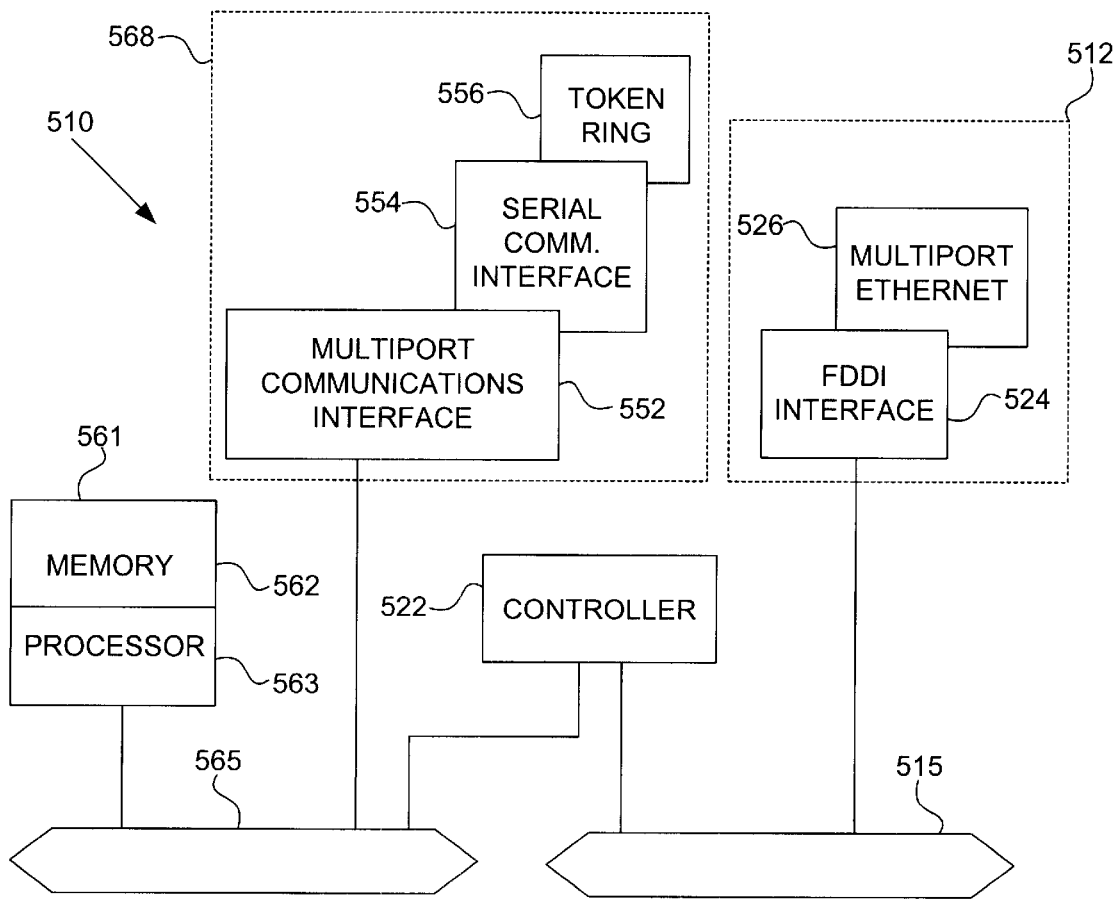
FIG. 5 depicts a router hardware architecture that may be used to implement the systems and methods of the present invention.

Referring now to FIG. 5, a router 510 suitable for implementing the present invention includes a master central processing unit (CPU) 562, low and medium speed interfaces 568, and high-speed interfaces 512. When acting under the control of appropriate software or firmware, the CPU 562 is responsible for such router tasks as routing table computations and network management. It may also be responsible for running a stimulus response engine. It preferably accomplishes all these functions under the control of software including an operating system (e.g., the Internet Operating System (IOS®) of Cisco Systems, Inc.) and any appropriate applications software. CPU 562 may include one or more microprocessor chips 563 such as the Motorola MPC860 microprocessor, the Motorola 68030 microprocessor, or other available chips. In a preferred embodiment, a memory 561 (such as non-volatile RAM and/or ROM) also forms part of CPU 562. However, there are many different ways in which memory could be coupled to the system.

The interfaces 512 and 568 are typically provided as interface cards (sometimes referred to as "line cards"). Generally, they control the sending and receipt of data packets over the network and sometimes support other peripherals used with the router 510. The low and medium speed interfaces 568 include a multiport communications interface 552, a serial communications interface 554, and a token ring interface 556. The high-speed interfaces 512 include an FDDI interface 524 and a multiport ethernet interface 526. Preferably, each of these interfaces (low/medium and high-speed) includes (1) a plurality of ports appropriate for communication with the appropriate media, and (2) an independent processor such as the 2901 bit slice processor (available from Advanced Micro Devices corporation of Santa Clara Calif.), and in some instances (3) volatile RAM. The independent processors control such communications intensive tasks as packet switching, media control and management. By providing separate processors for the communications intensive tasks, this architecture permits the master microprocessor 562 to efficiently perform routing computations, network diagnostics, security functions, etc.

The low and medium speed interfaces are coupled to the master CPU 562 through a data, control, and address bus 565. High-speed interfaces 512 are connected to the bus 565 through a fast data, control, and address bus 515 which is in turn connected to a bus controller 522. The bus controller functions are provided by a processor such as a 2901 bit slice processor.

Although the system shown in FIG. 5 is one preferred router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration, it may employ one or more memories or memory modules (including memory 561) configured to store program instructions for the network operations and SRE scripts described herein. The program instructions may specify an operating system and one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Preferably, a scripting language in accordance with the present invention is distinguished from a compiled program for testing network protocols in that it is configurable by the user to test or simulate virtually any network protocol. Thus, a SRE script is preferably interpreted by a SRE only after it is programmed by the user. This is to be contrasted with network protocol test systems which are obtained by the user in a compiled form and are not thereafter programmable by the user.

In a preferred embodiment, a SRE script is written for a particular testing scenario by a user. The script is loaded into a router running a SRE. The script then goes through two phases of interpretation: in a first phase, the syntax of the script is checked to ensure that it is correct and it is converted into internal OP codes. The interpreter is capable of recognizing program code commands specifying a state change of a network device. Then, in the second phase, when the SRE script is run, it runs directly from these OP codes so that it runs much faster than if it had to be interpreted from its original character strings at run time. Interpreters suitable for the interpretation of SRE scripts in accordance with the present invention are well known to those of skill in the art.

It should also be noted that alternative embodiments of the present invention may make use of a compiler to convert SRE scripts into a format that can be run on a machine (e.g., a network device, such as a router). In such an alternative embodiment, SRE scripts could be loaded into a router, for example, and then compiled into machine language in its entirety before being run.

Conclusion

The present invention obviates the need to model network application behavior, which is a very expensive and time-consuming task, by compiling the dialogues into a single tool which acts like the various protocols that participate in a network application. As such, the behavior of multiple devices may be simulated with one SRE.

Forcing complex fault scenarios is facilitated by use of the tool. Often to evaluate error handling behavior of protocols and network applications a great deal of dialogue must occur to set the context for the interaction of interest. Conventionally, this is done indirectly with limited control. With a SRE in accordance with the present invention (and appropriate scripts) the exact desired dialogue sequence, across multiple network connections can be created leading up to an interaction of interest. At that point, the stimulus (usually a packet) can be provided and the response observed for correctness. Thus, the SRE makes it easier to emulate complex fault case scenarios.

The SRE may be used for protocol conformance, error handling testing, protocol validation, and network application behavior evaluation (e.g., for streaming video, IGMP, etc). It may also be used to setup context prior to traffic tests (e.g., for DHCP spoofing in cable modems). This tool has a wide range of network testing, as well as diagnostic and measurement applications. The present invention provides a test system including hardware and software which can be configured to test virtually any protocol without having to build large networks, and it is more advanced than many of the current tools offered by network test tool vendors.

The tool facilitates the design and testing of large scale networks by eliminating the need to build a large network (very costly for analyzers and network equipment) by instead emulating networks, and it runs on a router.

Among the advantages of the present invention is the fact that it is able to distinguish between operating states of a network protocol under test. Therefore, it can match patterns on a state by state basis. This is as opposed to conventional test equipment which can only match all of the patterns in a particular network protocol, independent of the state in which the protocol is operating. As a result, conventional protocol analyzers are unable to detect an error where a given pattern is detected in a state where it should not be.

Secondly, as a result of the fact that conventional test systems must match all patterns in a protocol under test, they are slower than the present invention which matches patterns state specifically Oust those patterns in the current state).

Also, the invention allows a pattern (packet) to be modified during a test run in a dynamic fashion. This is as opposed to conventional test systems in which test patterns are fixed (static) once the test has begun. Conventional systems would not have allowed changing of a pattern after the test had been initiated.

The script language of the present invention is based on a state machine model which is particularly useful for this application since implementation of test protocols is best understood in terms of a state machine model. This is because the language describes the protocol in states rather than in a chronological flow pattern. In addition, since the language is based on a state machine model, it can concurrently run multiples of the same or different models, that is, the language is extensible.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method, implemented on a computing device, for simulating one or more network activities, the method comprising:

providing a program code written in a scripting language, the scripting language being usable for modeling a plurality of different protocols, the scripting language including commands for modeling individual and integrated states of a state machine which represent at least a portion of a protocol selected from the different protocols, the commands including at least a command for defining a state and a command for indicating a state change, the program code specifying a model of at least a portion of a protocol selected from the different protocols; and converting said program code to machine executable instructions for executing said model.

2. The method of claim 1, wherein said language further includes commands specifying a definition of a state and registration of a packet filter.

3. The method of claim 1, wherein the language further includes commands for generating a send/expect model which has a control flow.

4. The method of claim 1, wherein the control flow specifies:

defining a packet filter based on a packet to be sent to test a network protocol;

sending the packet; and matching a response to the packet with the packet filter; and where the response packet matches the filter, taking an action associated with the packet filter.

5. The method of claim 4, wherein said packet is modified during testing.

6. The method of claim 1, further comprising running the program code to simulate the one or more network activities.

7. The method of claim 6, wherein the program code is run on a router.

8. The method of claim 1, wherein the model tests an operating system for a network device.

9. The method of claim 1, wherein the model simulates the operation of one or more networking protocols.

10. The method of claim 1, wherein said language provides a user with the capability of writing and running program code for generating models for testing a plurality of different computer network protocols.

11. The method of claim 1, wherein said step of converting said program code to machine executable instructions comprises interpreting said program code.

12. The method of claim 1, wherein said step of converting said program code to machine executable instructions comprises compiling said program code.

13. A system for controlling the generation of a model of one or more network devices, with the aid of a network device, the system comprising:

a converter that recognizes program code commands written in a scripting language and converts such program code to generate a model of one or more network devices, the scripting language being usable for modeling a plurality of different protocols, the scripting language including commands for modeling individual and integrated states of a state machine which represent at least a portion of a protocol selected from the different protocols, the commands including at least a command for defining a state and a command for indicating a state change, the program code specifying a model of at least a portion of a protocol interface selected from the different protocols; and a network device operating system on which the program code runs.

14. The system of claim 13, wherein said converter is an interpreter.

15. The system of claim 13, wherein said program code commands further specify definition of a state and registration of a packet filter.

16. The system of claim 13, wherein said model has a control flow comprising the steps of:

defining a packet filter based on a packet to be sent to test a network protocol;

sending the packet; and matching a response to the packet with the packet filter; and where the response packet matches the filter, taking an action associated with the packet filter.

17. A computer program product comprising a computer-usable medium having computer-readable program code embodied thereon relating to simulating one or more network activities, the computer-readable program code effecting the following steps within a computing system:

provides a program code written in a scripting language, the scripting language being usable for modeling a plurality of different protocols, the scripting language including commands for modeling individual and integrated states of a state machine which represent at least a portion of a protocol selected from the different protocols, the commands including at least a command for defining a state and a command for indicating a state change, the program code specifying a model of at least a portion of a protocol interface selected from the different protocols; and converting said program code to machine executable instructions for executing said model.

18. The computer program product of claim 17, wherein said language further includes commands specifying definition of a state and registration of a packet filter.

19. The computer program product of claim 17, wherein said model has a control flow comprising the steps of:

defining a packet filter based on a packet to be sent to test a network protocol;

sending the packet; and matching a response to the packet with the packet filter; and where the response packet matches the filter, taking an action associated with the packet filter.

20. The computer program product of claim 19, wherein said packet is modified during testing.

21. The computer program product of claim 17, further comprising running the program code to simulate the one or more network activities.

22. The computer program product of claim 21, wherein the program code is run on a router.

23. The computer program product of claim 17, wherein the model tests an operating system for a network device.

24. The computer program product of claim 17, wherein the model simulates the operation of one or more networking protocols.

25. The computer program product of claim 17, wherein said language provides a user with the capability of writing and running program code for generating a model for testing a plurality of different computer network protocols.

26. The computer program product of claim 17, wherein the computer-usable medium comprises at least one of a magnetic medium, an optical medium, a hardware device specially configured to store and perform program instructions, and a carrier wave.

27. An apparatus for simulating one or more network activities, the apparatus comprising:

means for providing a program code written in a scripting language, the scripting language being usable for modeling a plurality of different protocols, the scripting language including commands for modeling individual and integrated states of a state machine which represent at least a portion of a protocol selected from the different protocols, the commands including at least a command for defining a state and a command for indicating a state change, the program code specifying a model of at least a portion of a protocol interface selected from the different protocols; and means for converting said program code to machine executable instructions for executing said model.

28. The apparatus of claim 27, wherein the language includes commands for generating a send/expect model which has a control flow.

* * * * *

UNITED STATES PATENT AND TRADEMARK OFFICE
CERTIFICATE OF CORRECTION

PATENT NO.   : 6,549,882 B1
DATED        : April 15, 2003
INVENTOR(S)  : Chen et al.

It is certified that error appears in the above-identified patent and that said Letters Patent is hereby corrected as shown below:

<u>Title page, Item [54] and Column 1, lines 1-4,</u>
Change "MECHANISMS FOR PROVIDING AND USING A SCRIPTING LANGUAGE FOR FLEXIBLY SIMULATIONG A PLURALITY OF DIFFERENT NETWORK PROTOCOLS" to -- MECHANISMS FOR PROVIDING AND USING A SCRIPTING LANGUAGE FOR FLEXIBLY SIMULATING A PLURALITY OF DIFFERENT NETWORK PROTOCOLS --

Signed and Sealed this

Twenty-sixth Day of August, 2003

JAMES E. ROGAN
*Director of the United States Patent and Trademark Office*